Patented Dec. 5, 1922.

1,437,571

UNITED STATES PATENT OFFICE.

CAMILLE VERNET AND GABRIEL RAUCH, OF GENEVA, SWITZERLAND, ASSIGNORS TO THE GRASSELLI CHEMICAL COMPANY, OF CLEVELAND, OHIO, A CORPORATION OF OHIO.

PROCESS OF PREPARING SODIUM SALTS OF ANTHRAQUINONE ALPHA DISULPHONIC ACIDS.

No Drawing.      Application filed January 22, 1921. Serial No. 439,248.

*To all whom it may concern:*

Be it known that we, CAMILLE VERNET and GABRIEL RAUCH, citizens of the Republic of Switzerland, residing at Geneva, Switzerland, have invented certain new and useful Improvements in Processes of Preparing Sodium Salts of Anthraquinone Alpha Disulphonic Acids, of which the following is a specification.

It is known that if anthraquinone be sulfonated with fuming sulfuric acid at high temperatures, a highly complex mixture containing anthraquinone 1.6, 1.7, 2.6 and 2.7 disulphonic acids is obtained. If, however, proceeding in accordance with U. S. Patent 742,910, the sulfonation is carried out in presence of mercury, a mixture consisting predominantly of alpha-alpha disulphonic acids is formed, the alpha-beta and beta-beta disulphonic acids being present only in relatively small proportions.

We have now found that although the main reaction product of the sulfonation of anthraquinone with fuming sulfuric acid in presence of mercury consists of the anthraquinone 1.5 and 1.8 of disulphonic acids the isomeric alpha-beta and beta-beta disulphonic acids are nevertheless simultaneously formed in lesser but material proportions.

The alpha-alpha disulphonic acids have heretofore been isolated from the sulfonation mass by crystallization and precipitation with potassium chlorid, as described for example in U. S. Patent 742,910 mentioned above. The acids isolated in this manner are however not pure, as a certain proportion of the isomeric alpha-beta and beta-beta disulphonic acids either crystallize out with the 1.5 acid or are precipitated in the form of the potassium salt with the 1.8 acid.

We have now discovered that the sodium salts of sulfuric acid, by which term we include sodium sulfate, sodium bisulfate, and all mixtures thereof, are capable of exerting a selective solvent action with respect to the several anthraquinone disulphonic acids; and we utilize this discovery to obtain the alpha-alpha disulphonic acids, and more particularly the 1.5 and 1.8 disulphonic acids and their salts, or mixtures thereof, substantially free from salts of the isomeric alpha-beta and beta-beta disulphonic acids. Our process depends upon the differing solubilities of the respective sodium salts, the alpha-beta and beta-beta disulphonic acid salts alone being soluble in sufficiently concentrated solutions of the sodium salts of sulfuric acid.

The process may be applied in various ways according to the results desired. For example, we may precipitate the 1.5 and 1.8 disulphonic acids together from the sulfonation mass as obtained by sulfonating anthraquinone with oleum in presence of mercury: or we may first separate the 1.5 disulphonic acid from the said mass by crystallization and filtration in the usual manner, and then precipitate the 1.8 disulphonic acid in substantially pure state from the remaining mother liquor containing the isomeric disulphonic acids: or we may utilize the invention for the purification of the crude mixtures containing alpha-alpha, alpha-beta and beta-beta disulphonic acids as obtained by the precipitating methods heretofore known, by acting selectively upon said crude mixtures with solutions of the sodium salts of sulfuric acid to extract therefrom the isomeric alpha-beta and beta-beta disulphonic acids in the form of their salts, leaving undissolved the 1.5 and 1.8 disulphonic acid sodium salts.

Following are certain specific examples of the manner in which the sodium salts of pure anthraquinone alpha disulphonic acids may be obtained from the sulfonation mass, the parts being by weight; it is to be understood however that the invention is not limited to these examples:

Example I.

300 parts of the sulfonation mixture containing essentially the anthraquinone 1.5 and 1.8 disulphonic acids together with small proportions of the isomeric alpha-beta and beta-beta acids, and which has been obtained, e. g., according to U. S. Patent 742,910, are run into 1200 parts of a concentrated sodium sulfate solution; the mixture is well stirred and after some standing the sodium salts of the anthraquinone 1.5 and 1.8 disulphonic acids crystallize out, substantially free from the sodium salts of isomeric anthraquinone alpha-beta and beta-beta disulphonic acids. This example applies more particularly to those cases in which a separation of the two alpha acids is not desired, but these two acids can of course be separated later, through their differing solubilities in sulfuric acid or by any other appropriate method.

Example II.

100 parts of anthraquinone are heated for some hours to 150–160° C. with one part of mercurous sulfate and 200 parts of fuming sulfuric acid (44% $SO_3$) according to U. S. Patent 742,910. The melt is diluted with 75 parts of 66° sulfuric acid, cooled, and the anthraquinone 1.5 disulphonic acid, which has crystallized out, is filtered off. The mother liquor which is substantially free from anthraquinone 1.5 disulphonic acid, is diluted with 900 parts of water and to this solution 600 parts of sodium sulfate and 300 parts of sodium bisulfate are added. The mixture is stirred for several hours, and after standing the sodium salt of anthraquinone 1.8 disulphonic acid crystallizes out.

Example III.

300 parts of the sulfonation mass from which the anthraquinone 1.5 disulphonic acid has been eliminated as in Example II and which contains the anthraquinone 1.8 disulphonic acid, in addition to small amounts of other isomeric anthraquinone disulphonic acids, especially the alpha-beta and beta-beta disulphonic acids, are run into a mixture of 200 parts of water and 180 parts of crystallized sodium sulfate and the mixture is well stirred. The sodium salt of anthraquinone 1.8 disulphonic acid crystallizes out after some standing and can be filtered off and freed by washing from any admixture of sodium sulfate. It is substantially free from the sodium salts of other anthraquinone disulphonic acids.

Example IV.

100 parts of anthraquinone are sulfonated at 160° C. with 200 parts of fuming sulfuric acid (44% $SO_3$) and one part of mercurous sulfate. When a test portion dissolves clearly in water, the melt is cooled to about 50° C. and 75 parts of 66° sulfuric acid are added. The anthraquinone 1.5 disulphonic acid crystallizes out and is filtered off.

50 parts of this acid are mixed with 40 parts of a saturated sodium sulfate solution and 20 parts of crystallized sodium sulfate are added, and the whole mass is well stirred; after standing for some hours the anthraquinone 1.5 disulphonic acid is transformed into its sodium salt and can be filtered off and freed by washing from any admixture of sodium sulfate. It is substantially free from other anthraquinone disulphonic acids.

Example V.

50 parts of crude anthraquinone 1.5 disulphonic acid obtained as in Example IV are dissolved in 60 parts of water and 20 parts of sodium sulfate and 30 parts of sodium bisulfate are added. The whole mass is thoroughly stirred and after some time the sodium salt of anthraquinone 1.5 disulphonic acid crystallizes out, whereas the sodium salts of the other anthraquinone disulphonic acids remain in solution.

We claim:—

1. The hereindescribed process of preparing salts of anthraquinone alpha disulphonic acids substantially free from the isomeric alpha-beta and beta-beta acids, comprising subjecting a mixture of said acids to the selective solvent action of a sodium salt of sulfuric acid.

2. The hereindescribed process of preparing salts of anthraquinone alpha disulphonic acids substantially free from the isomeric alpha-beta and beta-beta acids, comprising selectively precipitating the alpha acids in the form of their sodium salts from the sulfonation mixture containing also the isomeric alpha-beta and beta-beta acids by adding thereto a sodium salt of sulfuric acid.

3. The hereindescribed process of isolating the 1.5 and 1.8 anthraquinone disulphonic acids from a crude reaction mixture containing also the isomeric alpha-beta and beta-beta acids, said process comprising crystallizing out the 1.5 disulphonic acid from the reaction mass, and then selectively precipitating the 1.8 disulphonic acid from the mother liquor containing also the isomeric alpha-beta and beta-beta acids by adding thereto a sodium salt of sulfuric acid.

4. The hereindescribed process of isolating the 1.5 and 1.8 anthraquinone disulphonic acids from a crude reaction mixture containing also the isomeric alpha-beta and beta-beta acids, said process comprising crystallizing out the 1.5 disulphonic acid from the reaction mass, and then precipitating the 1.8 disulphonic acid from the mother liquor in the form of its sodium salt by adding thereto a sodium salt of sulfuric acid.

In testimony whereof, we affix our signatures.

CAMILLE VERNET.
GABRIEL RAUCH.